United States Patent
Nagasundaram et al.

(10) Patent No.: US 12,175,273 B2
(45) Date of Patent: Dec. 24, 2024

(54) DYNAMIC ROUTING OF WORKLOADS TO ACCELERATOR RESOURCES

(71) Applicant: Intel Corporation, Santa Clara, CA (US)

(72) Inventors: Devamekalai Nagasundaram, Jawi (MY); San Yen Wong, Penang (MY); Haarika Madaka, Bengaluru (IN); Wei Seng Yeap, Penang (MY); Marcos Carranza, Portland, OR (US); Cesar Martinez Spessot, Hillsboro, OR (US); Francesc Guim Bernat, Barcelona (ES); Rajesh Poornachandran, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 454 days.

(21) Appl. No.: 17/556,690

(22) Filed: Dec. 20, 2021

(65) Prior Publication Data

US 2023/0195485 A1 Jun. 22, 2023

(51) Int. Cl.
 G06F 9/455 (2018.01)
 G06F 9/50 (2006.01)

(52) U.S. Cl.
 CPC .......... G06F 9/45558 (2013.01); G06F 9/505 (2013.01); *G06F 2009/4557* (2013.01)

(58) Field of Classification Search
 CPC .................................................. G06F 9/45558
 See application file for complete search history.

(56) References Cited

U.S. PATENT DOCUMENTS

2023/0076488 A1*  3/2023  Goiri Presa ......... G06F 11/3442

* cited by examiner

*Primary Examiner* — Charlie Sun
(74) *Attorney, Agent, or Firm* — Jaffery Watson Mendonsa & Hamilton LLP

(57) ABSTRACT

Embodiments described herein are generally directed to assigning virtual machine (VM) workloads to groupings/partitions of accelerator resources. In an example, a processing resource of a host system maintains: (i) a resource data structure containing resource utilization information for each of one or more accelerators associated with the host system; and (ii) a group data structure containing information regarding each group of multiple groups of one or more virtual functions (VFs) of the one or more accelerators that has been assigned for use by a respective VM of multiple VMs running on a virtual machine monitor (VMM) of the processing resource. A request to deploy a workload associated with a first VM is received. Responsive to the request, the workload is assigned to a VF of a group of the multiple groups determined to have resource capacity available to satisfy expected resource utilization of the workload.

20 Claims, 9 Drawing Sheets

DYNAMIC ROUTING OF WORKLOADS TO ACCELERATOR RESOURCES

TECHNICAL FIELD

Embodiments described herein generally relate to the field of hardware accelerators and, more particularly, to monitoring of resource utilization of accelerators and grouping of virtual functions (VFs) within an accelerator or spanning multiple accelerators to facilitate dynamic routing of virtual machine (VM) workloads accelerator resources.

BACKGROUND

The use of hardware accelerators (e.g., graphics processing units (GPU)) for edge computing has enabled faster workload processing and has emerged as an effective architecture for acceleration of Artificial Intelligence (AI) and Machine Learning (ML) use cases at the edge. Meanwhile, the growing popularity of AI and ML is increasing the demand for virtual machines (VMs).

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
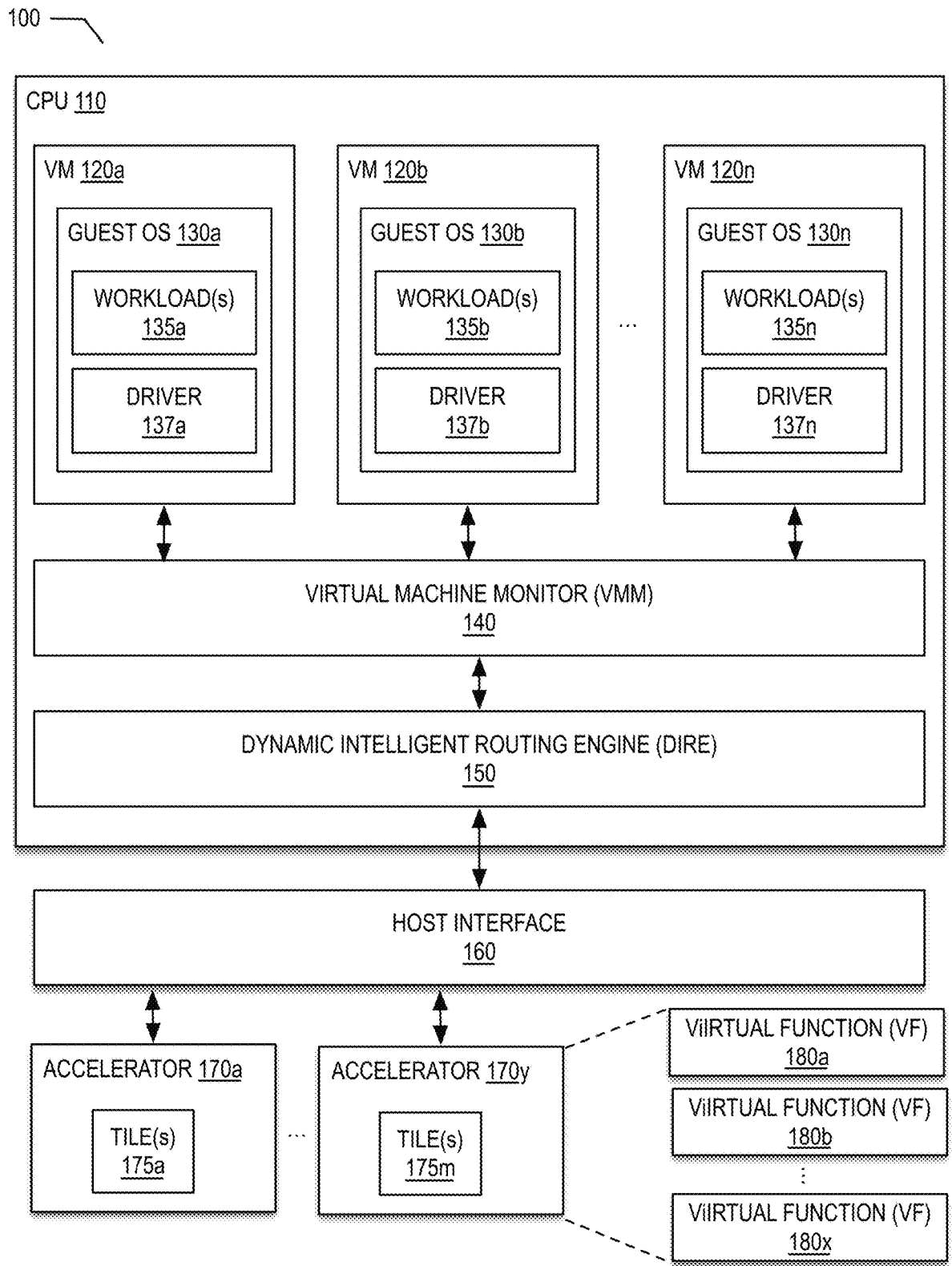
FIG. 1 is a block diagram illustrating a host system for dynamically routing workloads to accelerators according to some embodiments.

Embodiments described herein are generally directed to assigning virtual machine workloads to groupings or partitions of resources of accelerators. Numerous virtualization and workload consolidation technologies exist, including containerization, Graphic Single Root Input/Output Virtualization (SR-IOV), Intel® Scalable Input/Output Virtualization (IOV), Compute Unified Device Architecture (CUDA), Multi-Queue Operations using Vulkan Kompute, For sake of brevity, rather than presenting a detailed overview of these existing virtualization and workload consolidation technologies, it is simply noted each have respective tradeoffs in which limitations include one or more of a potentially less secure environment as a result of use of process-level isolation, sequential workload processing, static pre-configuration of the resource allocation for each VM, complex manual configuration, and/or a restricted number of VMs that may be associated with a given accelerator.

Consequently, while discrete graphics for edge computing has facilitated faster workload processing at the edge, various issues are hindering the implementation of graphics virtualization environments in edge servers. For example, while a single workload may be parallelized across multiple GPUs, the inability to support concurrent processing of multiple VM workloads by Peripheral Component Interconnect Express (PCIe) devices leads to the multiple workloads being run sequentially. Similar problems arise when multiple VMs attempt to share a single integrated or discrete GPU. Meanwhile, current load balancing technology for virtualization environments remains immature, thereby making it difficult to implement virtualization and workload consolidation, for example, in a chassis having servers of different form factors. As will be appreciated by those skilled in the art, the inability to efficiently utilize accelerator resources further results in increased total cost of ownership for both cloud service providers and end users.

Embodiments described herein seek to address or at least ameliorate the present circumstances by partitioning and/or grouping accelerator resources to facilitate dynamic routing of VM workloads to accelerator resources. Accelerators may be made up of multiple accelerator sub processing units (which may be referred to herein as tiles or chiplets). Slices of physical resources at a tile level or at an accelerator level may be predefined and exposed by an accelerator via a host interface as Virtual Functions (VFs). For example, in the context of a graphics processing unit (GPU), a VF may include a portion of memory and one or more GPU cores. According to one embodiment, a Dynamic Intelligent Routing Engine (DIRE) running on a processing resource (e.g., a Central Processing Unit (CPU)) of a host system maintains: (i) a resource data structure containing information regarding resource utilization of each accelerator of a set of one or more accelerators associated with the host system; and (ii) a group data structure containing information regarding each group of multiple groups of one or more virtual functions (VFs) of the set of one or more accelerators that has been assigned for use by a respective virtual machine (VM) of multiple VMs running on a virtual machine monitor (VMM) of the processing resource. A request to deploy a workload associated with a first VM of the multiple VMs is received. Responsive to the request, the workload is assigned by the DIRE to a VF of a group of the multiple groups determined to have resource capacity available to satisfy expected resource utilization of the workload.

In one embodiment, when insufficient capacity is available, an additional discrete accelerator card coupled to the processing resource, for example, via a host interface (e.g., a PCIe interface) may be detected by the workload routing module and added to the resource data structure to facilitate, resource groupings may be updated, and the workload may be routed to a VF of the additional discrete accelerator card. In this manner, multiple workloads from the same VM may be processed in parallel by different accelerators, thereby addressing the sequential workload processing problem discussed above. Additionally, or alternatively, in some examples, multiple workloads from the same VM may be processed in parallel by the same accelerator by virtue of the proposed accelerator resource partitioning and grouping approaches.

Additionally, as described further below, in some embodiments, a forecast regarding future workloads and/or policies (e.g., a set of one or more remapping criteria) may also be taken into consideration during workload analysis and workload assignment processing and/or may be used to facilitate activation of various power management states (e.g., selective handling of XPU D0ix and/or S0ix states).

While various examples may be described herein with reference to dynamically routing VM workloads by considering various features and metrics of local resource pools (e.g., accelerator resources) associated with a particular host system, it is to be appreciated remote resource pools (e.g., accelerator resources associated with a remote host system) may also be considered. As those skilled in the art will appreciate when remote resource pools are considered, bandwidth and latency should also be factored in so as to allow workload analytics to make appropriate workload assignment decisions from a Quality of Service (QoS) perspective.

While various examples may be described herein with reference to offloading workloads from a processing resource of a host system to one or more discrete hardware accelerators, the methodologies described herein are also applicable to use cases in which the processing resource of the host system is represented in the form of a system on a chip (SoC) integrated circuit that includes one or more general-purpose microprocessors as well as integrated hardware accelerators (e.g., XPUs). As such, it is to be appreciated workloads may be offloaded to discrete and/or integrated hardware accelerators.

Similarly, while various examples may be described herein using graphics virtualization (e.g., virtualization of one or more discrete GPUs) as a particular use case, it is to be appreciated the methodologies described herein are applicable to hardware accelerators (e.g., XPUs) more generally, including Video Processing Units (VPUs), Infrastructure Processing Units (IPUs), Application Processing Units (APUs), Data Processing Units (DPUs), Field-Programmable Gate Arrays (FPGAs), Network Interface Cards (NICs), and the like.

Terminology

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, a "Virtual Function" or "VF" generally refers to a predefined slice of physical resources of a hardware accelerator. In various examples, VFs within a single accelerator or spanning multiple accelerators may be grouped into multiple groups. A given group of one or more VFs may be assigned for use by a particular VM and the workloads of the VM may be distributed (e.g., load balanced) across the one or more VFs.

As used herein, an "XPU" generally refers to an offload target (e.g., a hardware accelerator) commanded by a CPU. In a heterogeneous computing environment (e.g., one or more host devices having one or more integrated XPUs or one or more associated discrete XPUs), microservices may be concurrently executing on different types of hardware accelerators. Non-limiting examples of XPUs include Graphics Processing Units (GPUs), Field-Programmable Gate Arrays (FPGAs), Application-Specific Integrated Circuits (ASICs), Digital Signal Processors (DSPs), Tensor Processing Units (TPUs), Video Processing Units (VPUs), Infrastructure Processing Units (IPUs), Application Processing Units (APUs), Data Processing Units (DPUs), Network Processing Units (NPUs), and Smart Network Interface Cards (SmartNICs).

Example Host System

FIG. 1 is a block diagram illustrating a host system 100 for dynamically routing workloads to accelerators according to some embodiments. In the context of the present example, the host system 100 is shown including a CPU 110 running a virtual machine monitor (VMM) 140 and a Dynamic Intelligent Routing Engine (DIRE). The host system 100 may represent a server in a public, private, or hybrid cloud or may represent an edge server located at the edge of a given network to facilitate performance of certain processing physically closer to one or more systems or applications that are creating the data being stored on and/or used by the edge server.

Depending upon the particular implementation, the VMM 140 may be a bare metal hypervisor (e.g., Kernel-based Virtual Machine (KVM), ACRN, VMware ESXi, Citrix XenServer, or Microsoft Hyper-V hypervisor) or may be a hosted hypervisor. The VMM 140 is responsible for allowing the host system 100 to support multiple VMs (e.g., 120a-n) by virtually sharing its resources (e.g., memory resources and processing resources) for use by the VMs.

Each of the VMs may run a guest operating system (OS) (e.g., Linux or Windows) as well as a driver (e.g., 137a-n) for interfacing with accelerators (e.g., accelerators 170a-x) compatible with one or more input/output (I/O) bus technologies (e.g., Accelerated Graphics Port (AGP), Peripheral Component Interconnect (PCI), PCI eXtended (PCI-X), PCI Express, or the like).

In the context of the present example, the DIRE 150 is logically interposed between the VMM 140 and a host interface 160 (e.g., a serial or parallel expansion bus implementing one or more I/O bus technologies) and may be responsible for dynamically routing workloads (e.g., workloads 135a-n) of the VMs to one or more hardware accelerators (e.g., accelerators 170a-y) coupled to the host system 100 via the host interface 160. A non-limiting example of various functional units that might make up the DIRE 150 is described below with reference to FIG. 2.

The accelerators may represent one or more types of hardware accelerators (e.g., XPUs) to which various tasks (e.g., workloads 135a-n) may be offloaded from the CPU 100. For example, workloads 135a-n may include large AI and/or ML tasks that may be more efficiently performed by a graphics processing unit (GPU) than the CPU 100. In one embodiment, rather than being manufactured on a single piece of silicon, one or more of the accelerators may be made up of one or more smaller integrated circuit (IC) blocks (e.g., tile(s) 175a and tiles(s) 175m), for example, that represent reusable IP blocks that are specifically designed to work with other similar IC blocks to form larger more complex chips (e.g., accelerators 170a-y).

In various examples described herein, slices of physical resources (not shown) of individual accelerators (e.g., at the tile level and/or at the accelerator level) may be predefined (e.g., via a configuration file associated with the particular accelerator) and exposed as Virtual Functions (VFs) (e.g., VFs 180a-x). As described further below various forms of partitioning and grouping of accelerator resources may be performed by the DIRE 150 by maintaining information regarding groups of one or more VFs. In one embodiment, the level of granularity of accelerator resources that may be assigned for use by a VM may range from (i) a group including a single VF representing a slice of resources of a single tile of a particular hardware accelerator to (ii) a group including multiple VFs representing the entirety of physical resources of all available hardware accelerators. In this manner, the resources of one or multiple hardware accelerators may be efficiently partitioned at the appropriate level of granularity that promotes efficient allocation among the VMs. For example, instead of allocating one GPU of a host system to each application running on a VM, if all the acceleration can be served via a single tile of one of multiple GPUs, the DIRE 150 can accomplish that via partitioning. Similarly, the DIRE 150 may aggregate ingredient functionality (e.g., VFs) by grouping multiple VFs of the same GPU or different GPUs for use by a single microservice.

Example Dynamic Intelligent Routing Engine (DIRE)

Figure 2:
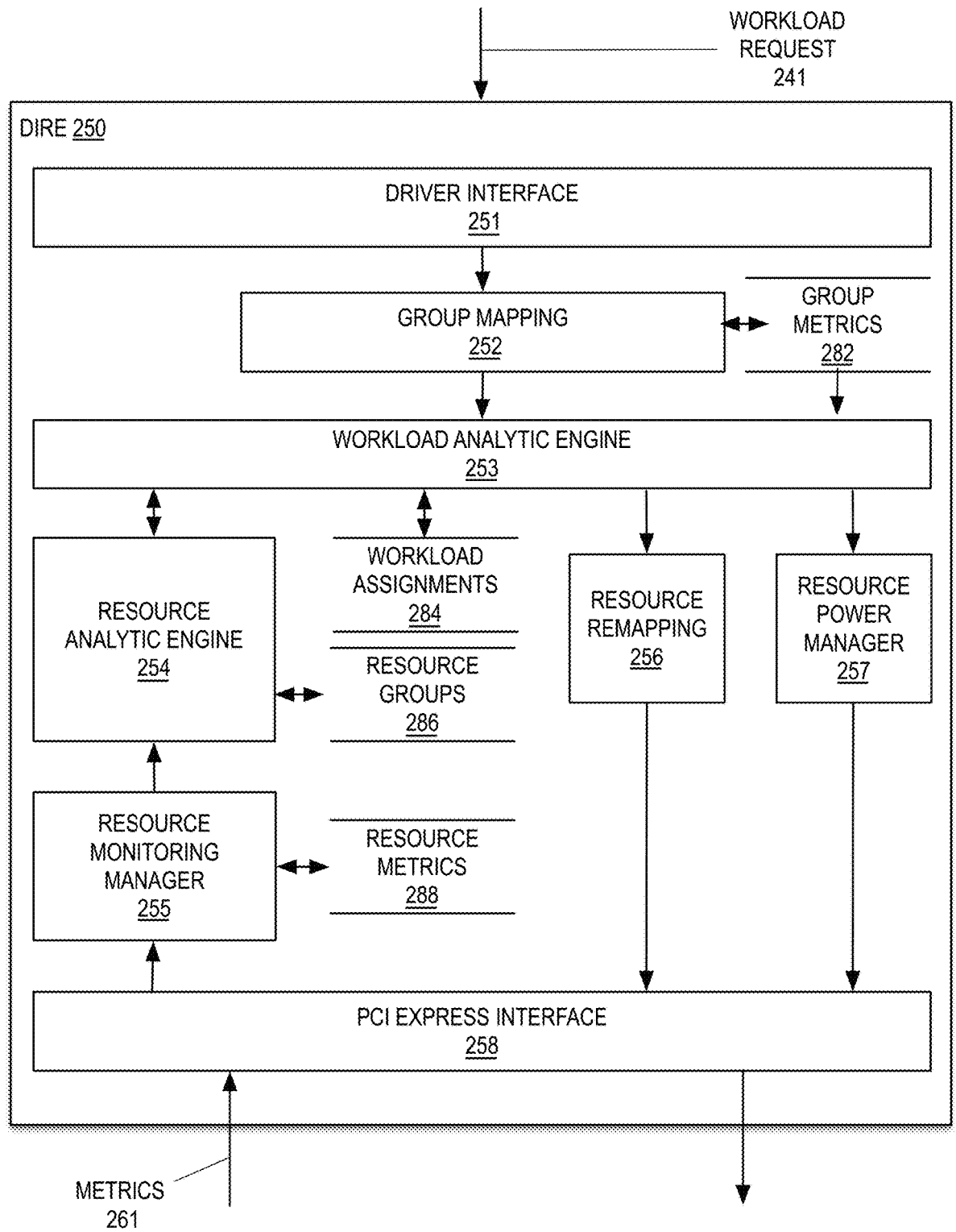
FIG. 2 is a block diagram of a Dynamic Intelligent Routing Engine (DIRE) according to some embodiments.

FIG. 2 is a block diagram of a Dynamic Intelligent Routing Engine (DIRE) 250 according to some embodiments. DIRE 250 represents an example of DIRE 150 of FIG. 1. In the context of the present example, DIRE 250 includes a driver interface 251, a group mapping module 252, a workload analytic engine 253, a resource analytic engine 254, a resource monitoring manager 255, a resource mapping module 256, a resource power manager 257, and a PCI Express interface 258.

The driver interface 251 may represent an interface compatible with drivers (e.g., drivers 137a-n) used by the guest OSs (e.g., guest OS 130a-n) in which the workloads (e.g., workloads 135a-n) of multiple VMs (e.g., VMs 120a-n) are running.

In one embodiment, DIRE 250 supports scaling as new VMs are created within or removed from the host system (e.g., host system 100). The group mapping module 252 may be responsible for, among other things, maintaining group mapping information that maps each of multiple groups of one or more VFs (e.g., VFs 180a-x) to its respective VM. The group mapping information may include the number of VMs running within the host system (e.g., host system 100) and information regarding the particular group of one or more VFs assigned to each VM as well as metrics for each VM. Table 1 (below) represents a non-limiting example of the group mapping information (e.g., group metrics 282) that may be maintained by the group mapping module 252.

TABLE 1

| Example of Group Metrics for VMs | | | |
|---|---|---|---|
| VM | $VM_1$ | $VM_2$ | $VM_3$ |
| Group | $G_1$ | $G_2$ | $G_3$ |
| vCPU Total Capacity (GHz) | 2.4 | 2.4 | 2.4 |
| vCPU Compute Utilization (%) | 80% | 100% | 50% |
| Group Memory Capacity (GB) | 8 GB | 8 GB | 8 GB |
| Group Memory Usage | 6 GB | 7.55 GB | 4 GB |
| Group Memory Utilization (%) | 75 | 94.375 | 50 |
| Group Compute Utilization (%) | 80 | 85 | 50 |

In Table 1, each VM is mapped to a particular group (e.g., $G_1$, $G_2$, or $G_3$) of one or more VFs exposed by the accelerators. Examples of metrics maintained for each VM include, vCPU total capacity, vCPU compute utilization, memory capacity of the particular group, memory usage by the particular group, group memory utilization as a percentage of the total memory available for the particular group, and group compute utilization as a percentage of total compute capability for the particular group.

The workload analytic engine 252 may be responsible for, among other things, evaluating the workloads coming from each of the VMs based on the group mapping information, assigning workloads to a VF of the group assigned to the VM, for example, based on resource group information maintained regarding the one or more VFs associated with each group and based on resource metric information maintained regarding utilization of resources, for example, by accelerator (e.g., accelerators 170a-y) and by VF (e.g., VFs (180a-x)). Table 2 (below) represents a non-limiting example of the resource group information (e.g., resource groups 286). Table 3 (below) represents a non-limiting example of the resource metric information (e.g., resource metrics 288). The workload analytic engine 252 may also maintain workload assignment information regarding the VFs to which workloads have been assigned. Table 4 (below) represents a non-limiting example of the workload assignment information (e.g., workload assignments 284).

TABLE 2

| Example of Resource Group Information (e.g., Resource Groups 286) | |
|---|---|
| Group | VE(s) |
| $G_1$ | $GPU_1:VF_1$ |
| $G_2$ | $GPU_2:VF_1$ |
| | $GPU_3:VF_1$ |
| $G_3$ | $GPU_2:VF_2$ |
| | $GPU_3:VF_2$ |
| | $GPU_3:VF_3$ |

In Table 2, the one or more VFs associated with each group are identified. In this example, there are three groups (i.e., $G_1$, $G_2$, and $G_3$). $G_1$ includes one VF–$VF_1$ of $GPU_1$; $G_2$ includes two VFs–$VF_1$ of $GPU_2$ and $VF_1$ of $GPU_3$; $G_3$ includes three VFs–$VF_2$ of $GPU_2$, $VF_2$ of $GPU_3$, and $VF_3$ of $GPU_3$. As described further below, as new accelerators (in this case, GPUs) are associated and/or disassociated with the host system, the groups may be dynamically updated to add one or more new VFs of newly added accelerators and/or to remove one or more VFs of accelerators that have been removed as appropriate.

TABLE 3

Example of Resource Metric Information
(e.g., Resource Metrics 288)

| GPU | $GPU_1$ | $GPU_2$ | $GPU_3$ |
|---|---|---|---|
| vGPU Compute Capacity (GHz) | $VF_1$-1.7 | $VF_1$-1.7<br>$VF_2$-1.7 | $VF_1$-2.3<br>$VF_2$-2.3<br>$VF_3$-2.3 |
| vGPU Compute Utilization (%) | $VF_1$-80 | $VF_1$-45<br>$VF_2$-40 | $VF_1$-10<br>$VF_2$-20<br>$VF_3$-20 |
| GPU Compute Utilization (%) | 80 | 85 | 50 |
| Avg. Compute Utilization (%)-All GPUs | | 71 | |
| vGPU Memory (GB) | $VF_1$-12 | $VF_1$-6<br>$VF_2$-6 | $VF_1$-4<br>$VF_2$-4<br>$VF_3$-4 |
| vGPU Memory Utilization (%) | $VF_1$-80 | $VF_1$-70<br>$VF_2$-50 | $VF_1$-10<br>$VF_2$-10<br>$VF_3$-20 |
| GPU Memory Utilization (%) | 80 | 60 | 40 |
| Avg. Memory Utilization (%)-All GPUs | | 60 | |

In Table 3, various metrics may be tracked for each VF of each GPU as well as at the GPU level. In this example, the metrics include compute capacity, compute utilization, memory capacity, and memory utilization The average compute utilization and memory utilization across all GPU may also be tracked. As described further below, as accelerator monitoring is performed, the resource metric information is updated.

TABLE 4

Example of Workload Assignment Information
(e.g., Workload Assignments 284)

| Workload | VF |
|---|---|
| $VM_1$:$WL_1$ | $GPU_1$:$VF_1$ |
| $VM_1$:$WL_2$ | $GPU_1$:$VF_1$ |
| $VM_2$:$WL_1$ | $GPU_2$:$VF_1$ |
| $VM_2$:$WL_2$ | $GPU_3$:$VF_1$ |
| $VM_3$:$WL_1$ | $GPU_3$:$VF_2$ |
| $VM_3$:$WL_2$ | $GPU_2$:$VF_2$ |
| $VM_3$:$WL_3$ | $GPU_3$:$VF_3$ |
| $VM_3$:$WL_4$ | $GPU_3$:$VF_3$ |

In Table 4, a mapping of workloads to VFs is maintained. In the present example, $VM_1$ has two workloads (i.e., $WL_1$ and $WL_2$) both of which are running on $VF_1$ of $GPU_1$; $VM_2$ has two workloads (i.e., $WL_1$ and $WL_2$) running on $VF_1$ of $GPU_2$ and $VF_1$ of $GPU_3$, respectively; and $VM_3$ has four workloads (e.g., $WL_1$, $WL_2$, $WL_3$, and $WL_4$) running on $VF_2$ of $GPU_3$, $VF_2$ of $GPU_2$, $VF_3$ of $GPU_3$, and $VF_3$ of $GPU_3$, respectively. As described further below, as new workloads are assigned, the workload assignment information is updated.

In one embodiment, DIRE 250 supports scaling as new accelerators are associated or disassociated with the host system (e.g., connected or disconnected to the host interface 160). The resource analytic engine 254 may be responsible for aggregating resource metric information on behalf of the group mapping module 252 to reflect group level metrics to facilitate assignment of groups to VMs and/or determining when to perform resource remapping, for example, as described further below with reference to FIG. 4.

The resource monitoring manager 255 may be responsible for monitoring the accelerators to obtain the desired granularity of resource metric information, for example, at the accelerator level and/or at the VF level and maintaining the resource metric information. In one embodiment, the resource monitoring manager 255 may interrogate each accelerator regarding its respective resource utilization responsive to a predefined or configurable triggering event (e.g., expiration of a timer representing the accelerator monitoring interval). A non-limiting example of accelerator utilization monitoring processing that may be performed by the resource monitoring manager 255 is described further below with reference to FIG. 6. Responsive to association and/or disassociation of a new or existing accelerator, respectively, with the host system, the resource monitoring manager 255 may also be responsible for adding or removing the accelerator and its VFs to/from the resource metric information. Depending upon the particular implementation, the resource monitoring manager 255 may also be involved in the detection of the association and/or disassociation of accelerators with the host system.

The resource remapping module 256 may be responsible routing transactions (e.g., PCIe transactions) to appropriate accelerators. For example, depending upon the particular implementation, the resource remapping module 256 may be involved in performing a data transfer from a memory of the CPU to a memory of an accelerator exposing a VF to which a workload has been assigned.

The resource power manager 257 may be responsible for selectively powering up, powering down, and/or putting to sleep one or more accelerators or tiles (e.g., tile(s) 175a-m). In this manner, resource utilization management ***

The various modules, engines, managers, and the like of DIRE 250 and the processing described below with reference to the flow diagrams of FIGS. 3-7 may be implemented in the form of executable instructions stored on a machine readable medium and executed by a processing resource (e.g., a microcontroller, a microprocessor, a CPU core, an ASIC, an FPGA, or the like) and/or in the form of other types of electronic circuitry. For example, the processing may be performed by one or more virtual or physical computer systems of various forms, such as the computer system described below with reference to FIG. 8.

High-Level DIRE Processing

Figure 3:
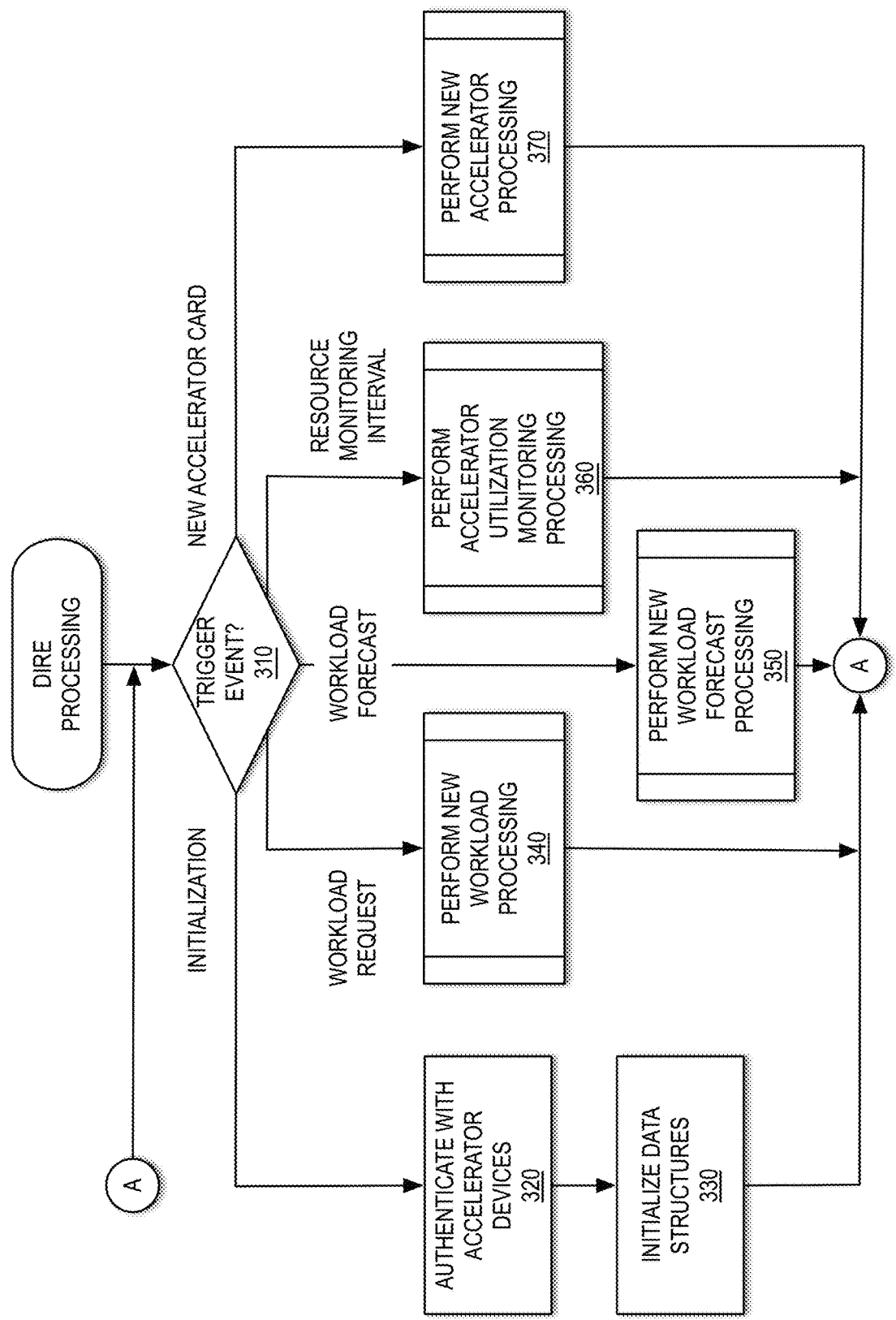
FIG. 3 is a flow diagram illustrating operations for performing DIRE processing according to some embodiments.

FIG. 3 is a flow diagram illustrating operations for performing DIRE processing according to some embodiments. At decision block 310, it is determined what type of trigger event has been received by a DIRE (e.g., DIRE 250). If the trigger event indicates initialization is to be performed, processing continues with block 320. If the trigger event represents receipt by DIRE of a new workload request from a VM (e.g., one of VMs 120a-n) via a VMM (e.g., VMM 140), processing continues with block 340. If the trigger event represents the availability of a new workload forecast, processing continues with block 350. If the trigger event represents expiration of a timer associated with a resource monitoring interval, processing continues with block 360. If the trigger event represents detection of a new accelerator card, processing continues with block 370.

At block 320, authentication is performed with the accelerator devices (e.g., accelerators 170a-y). For example, the CPU (e.g., CPU 110) and the accelerators may perform mutual authentication using hardware authentication supported by Trusted Platform Module (TPM) technology implemented by the host system (e.g., host system 100).

At block 330, various data structures used by DIRE may be initialized. For example, group metrics information (e.g., group metrics 282) may be initialized to reflect the VMs running on the VMM and resource metric information (e.g., resource metrics 288) may be initialized to reflect the accelerators currently associated with the host system.

At block 340, new workload processing is performed. For example, responsive to receipt of a new workload request from the VMM on behalf of one of the VMs, DIRE may, among other things, determine whether the new workload can be accommodated by the group of VFs (e.g., one or more of VFs 180*a-n*) assigned to the VM from which the new workload originated; and, if not, DIRE may dynamically modify the group by adding another VF (if one is available that can accommodate the new workload) to the group. A non-limiting example of new workload processing that may be performed by DIRE is described further below with reference to FIG. 4.

At block 350, new workload forecast processing is performed. For example, responsive to receipt of a new workload forecast for workloads expected to be run by the VMs, DIRE may, among other things, perform dynamic power management to selectively power up or power down one or more accelerators or tiles (e.g., tile(s) 175*a-m*). A non-limiting example of new workload forecast processing that may be performed by DIRE is described further below with reference to FIG. 5.

At block 360, accelerator utilization monitoring processing is performed. For example, responsive to a trigger event (e.g., expiration of a timer representing the accelerator monitoring interval), DIRE may, among other things, collect resource information from the accelerators. A non-limiting example of accelerator utilization monitoring processing that may be performed by DIRE is described further below with reference to FIG. 6.

At block 370, new accelerator processing is performed. For example, responsive to a trigger event indicative of the existence of a new accelerator associated with the host system, DIRE may, among other things, update resource metric information to reflect the existence of the new accelerator. A non-limiting example of new accelerator processing that may be performed by DIRE is described further below with reference to FIG. 7.

New Workload Processing

Figure 4:
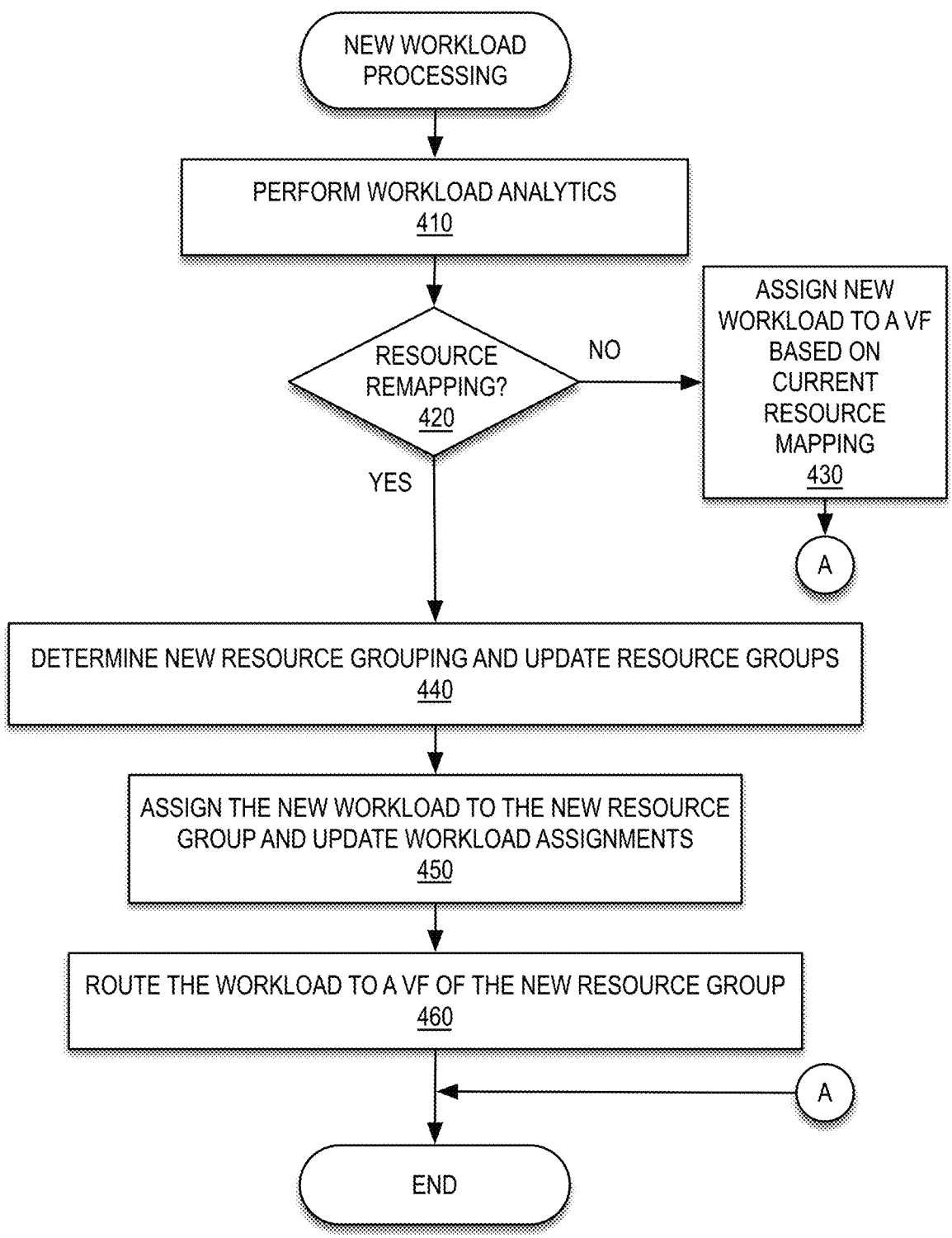
FIG. 4 is a flow diagram illustrating operations for performing new workload processing according to some embodiments.

FIG. 4 is a flow diagram illustrating operations for performing new workload processing according to some embodiments. In the context of the present example, it is assumed a new workload has been received by DIRE (e.g., DIRE 250) from a VMM (e.g., VMM 140) on behalf of a VM (e.g., one of VMs 120*a-n*) running on the VMM. The new workload processing described with reference to FIG. 4 represents an example of the processing that may be performed in block 340 of FIG. 3.

At block 410, workload analytics are performed. According to one embodiment, a workload analytic engine (e.g., workload analytic engine 253) updates workload assignment information (e.g., workload assignments 284) to include the new workload and requests resource group information (e.g., resource groups 286) and resource metric information (e.g., resource metrics 288) from a resource analytic engine (e.g., resource analytic engine 254) to facilitate the workload analytics. Based on group mapping information (e.g., group metrics 282), identifying a group of one or more VFs (e.g., VFs 180*a-x*) that has been assigned to respective VMs, the resource group information, and the resource metric information, the workload analytics may involve determining whether the group (if any) assigned to the VM has sufficient capacity and features to accommodate the new workload. For example, the new workload request may include a manifest specifying various aspects of the workload, including confidentiality, compute requirements, memory requirements, etc.

At decision block 420, it is determined whether resource remapping is to be performed. If so, processing continues with block 440; otherwise processing branches to block 430. In one embodiment, responsive to receipt of the first workload request from a particular VM, no group of one or more VFs may yet have been assigned to the VM, whereas for subsequent workload requests a group is assumed to have been assigned to the VM. As such, in the case of the former, resource remapping may involve creation of a new group to be assigned to the VM; and in the case of the latter, resource remapping may involve associating another available VF with the group already assigned to the VM. According to one embodiment, by comparing the various aspects of the new workload to corresponding capacities and features of the one or more VFs of the group, the workload analytic engine may identify a specific VF of the group to which the new workload should be routed; however, when no VF can be identified, the workload analytic engine may determine resource remapping is to be performed to include an identified VF within the existing group or a new group.

In one embodiment, whether resource remapping is to be performed may additionally or alternatively be based on a set of one or more predefined or configurable remapping criteria, for example, expressed in terms of QoS, efficiency, and/or operational costs. Using such remapping criteria, a particular VM may be reassigned from one group of one or more VFs to another despite lack of capacity constraints by the current group to which the particular VM is assigned to meet the current and/or expected future resource demands of workloads of the particular VM. For example, responsive to determining use of one of more particular VFs associated with a new accelerator would improve one or more remapping criteria by a predetermined or configurable threshold and/or responsive to determining the current group to which the particular VM is not currently satisfying or may not in the near future (e.g., based on a workload forecast) satisfy all or some portion of the set of remapping criteria, a new group including one or more of the particular VFs may be created and the particular VM may be reassigned from the current group to the new group.

At block 430, the new workload is assigned based on the current resource mapping. In the context of the present example, the workload is assigned to the VF previously identified by the workload analytic engine in block 420. Additionally, the workload assignment information may be updated to reflect the new workload assignment and the new workload may be routed via a PCIe interface (e.g., PCI express interface 258) to the accelerator exposing the identified VF.

At block 440, a new resource grouping is determined and the resource group information is updated. According to one embodiment, the new resource grouping may represent creation of a new group or addition of a VF to an existing group. For example, responsive to the first workload request by a particular VM, a new group may be created including the VF previously identified by the workload analytic engine in block 420 and assigned to the particular VM. Similarly, responsive to a subsequent workload request by the particular VM, the VF previously identified by the workload analytic engine in block 420 may be added to the existing group currently assigned to the VM. In either case, the resource group information is updated to reflect the new resource grouping.

At block 450, the new workload is assigned to the group that was newly created and assigned to the VM or the group that was dynamically updated in block 440. Specifically, the workload may be assigned to the VF of the newly created group or existing group previously identified by the workload analytic engine in block 420. Additionally, the workload assignment information may be updated to reflect the new workload assignment.

At block 460, the new workload is routed via a PCIe interface (e.g., PCI express interface 258) to the accelerator exposing the identified VF.

While not mentioned in the context of the present example, it is to be appreciated that a workload forecast, for example, predicting VM workloads that may be received during a future time period (e.g., within the next N minutes), may also be taken into consideration in connection with new workload processing. For example, the workload forecast may be used to reserve capacity of a VF of a group of one or more VFs assigned to a particular VM in anticipation of imminent receipt of a workload from the particular VM. Additionally, or alternatively, the workload forecast may influence whether resource remapping is to be performed. For example, in some embodiments, resource remapping may be performed to proactively to accommodate a workload predicted to be received by the workload forecast.

New Workload Forecast Processing

Figure 5:
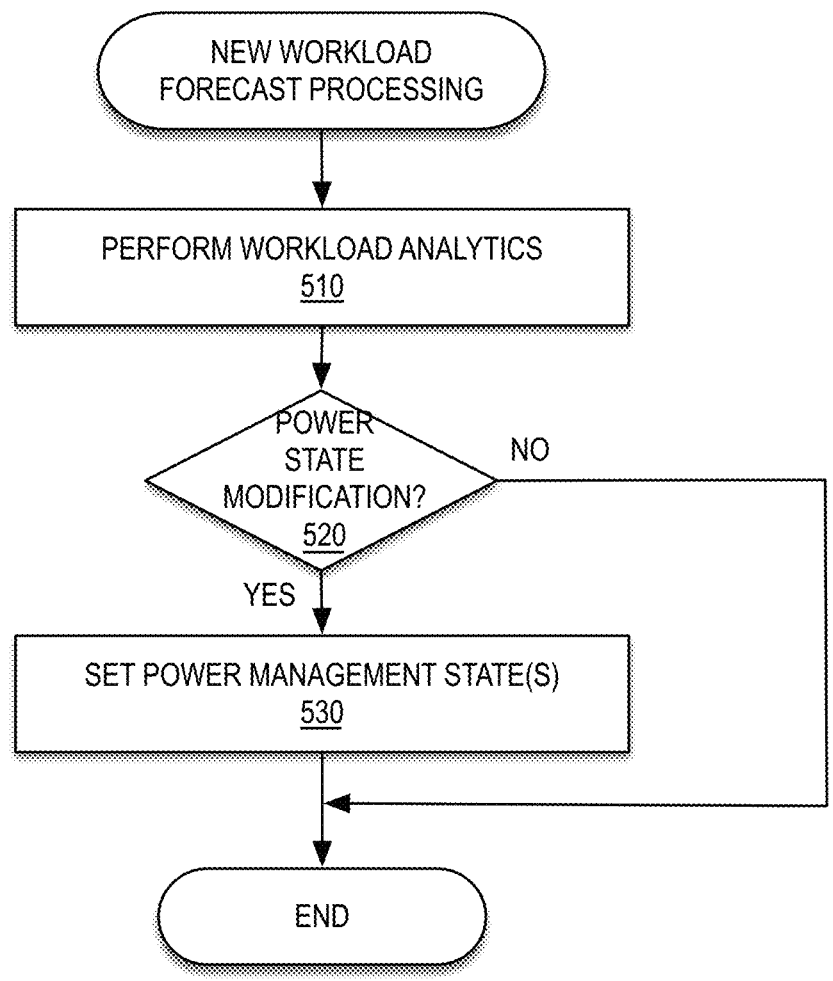
FIG. 5 is a flow diagram illustrating operations for performing new workload forecast processing according to some embodiments.

FIG. 5 is a flow diagram illustrating operations for performing new workload forecast processing according to some embodiments. In the context of the present example, it is assumed a new workload forecast has been received by DIRE (e.g., DIRE 250). Depending upon the particular implementation, another DIRE module may have generated the new workload forecast or the new workload forecast may have been generated by an external source (e.g., workload forecasting functionality running on CPU 110). The new workload forecasting processing described with reference to FIG. 5 represents an example of the processing that may be performed in block 350 of FIG. 3.

At block 510, workload analytics are performed. According to one embodiment, a workload analytic engine (e.g., workload analytic engine 253) requests resource group information (e.g., resource groups 286) and resource metric information (e.g., resource metrics 288) from a resource analytic engine (e.g., resource analytic engine 254) to facilitate the workload analytics. Based on group mapping information (e.g., group metrics 282), identifying a group of one or more VFs (e.g., VFs 180*a-x*) that has been assigned to respective VMs, the resource group information, and the resource metric information, the workload analytics may involve determining whether any of the accelerators (e.g., accelerators 170*a-y*) or tiles (e.g., tiles 175*a-m*) are predicted to be idle during a future time period (e.g., within the next N minutes) and/or whether any accelerator that is currently idle should be warmed up (e.g., taking into consideration warm-up time specified for the particular accelerator) due to the expected imminent receipt of a workload to be assigned to a VF of the accelerator.

At decision block 520, it is determined whether any power state modifications should be made based on the workload analytics performed at block 510. If so, processing continues with block 530; otherwise, new workload forecast processing is complete.

At block 530, one or more power management state(s) may be set based on the accelerator(s) predicted to be idle or predicted that should be warmed-up based on the workload analytics performed at block 510. For example, the workload analytic engine may direct a resource power manager (e.g., resource power manager 257) to selectively set D0ix/S0ix states as appropriate for the accelerator(s) or tile(s) identified in block 510.

Accelerator Utilization Monitoring

Figure 6:
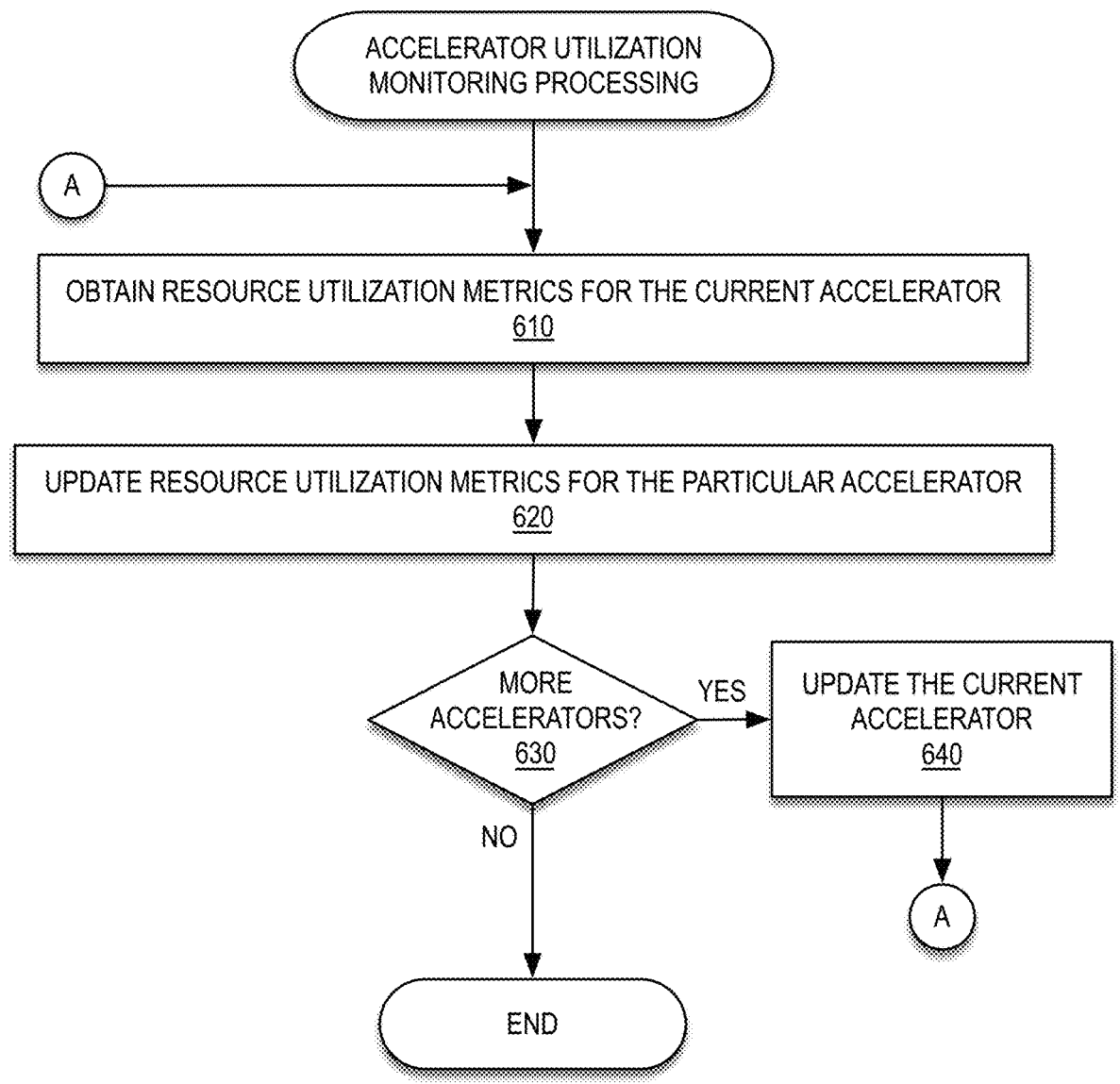
FIG. 6 is a flow diagram illustrating operations for performing accelerator utilization monitoring processing according to some embodiments.

FIG. 6 is a flow diagram illustrating operations for performing accelerator utilization monitoring processing according to some embodiments. In the context of the present example, it is assumed a trigger event has been received by DIRE (e.g., DIRE 250) indicating accelerator utilization monitoring is to be performed. The accelerator utilization monitoring processing described with reference to FIG. 6 represents an example of the processing that may be performed in block 360 of FIG. 3.

At block 610, resource utilization metrics are obtained by a resource monitoring manager (e.g., resource monitoring manager 255) for a current accelerator (e.g., one of accelerators 175*a-y*). Depending upon the particular implementation, the resource utilization metrics (e.g., metrics 261) may be obtained at the accelerator level or at a finer level of granularity (e.g., at a tile level).

At block 620, resource metric information (e.g., resource metrics 288) maintained by the resource monitoring manager are updated to reflect those obtained at block 610.

At decision block 630, it is determined whether there is another accelerator for which resource utilization metrics are to be obtained. If so, processing continues with block 640; otherwise, accelerator utilization monitoring processing is complete.

At block 640, the current accelerator is updated to the next accelerator for which resource utilization metrics are to be obtained and processing loops back to block 610.

New Accelerator Processing

Figure 7:
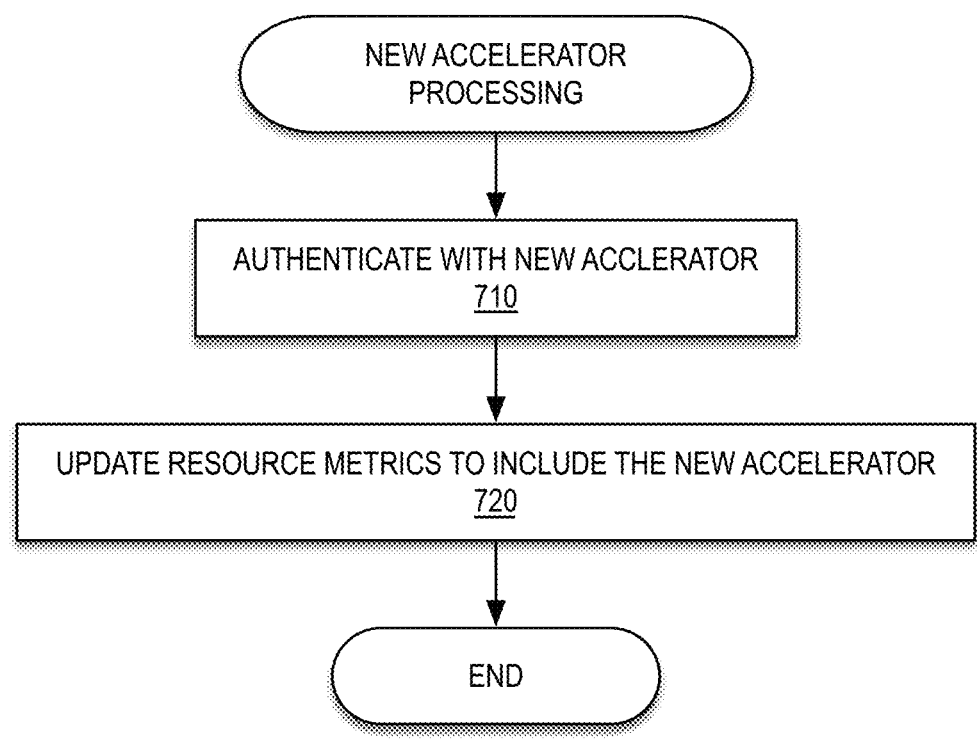
FIG. 7 is a flow diagram illustrating operations for performing new accelerator processing according to some embodiments.

FIG. 7 is a flow diagram illustrating operations for performing new accelerator processing according to some embodiments. In the context of the present example, it is assumed a new accelerator (e.g., one of accelerators 170*a-y*) has been associated with a host system (e.g., host system 100). Depending upon the particular implementation, the presence of the new accelerator may be detected as a result of support by the host system of hot swapping via system event monitoring and may generate an interrupt that triggers new accelerator processing by DIRE (e.g., DIRE 250). Alternatively, a resource monitoring manager (e.g., resource monitoring manager 255) may periodically monitor to detect new accelerator insertion. The new accelerator processing described with reference to FIG. 7 represents an example of the processing that may be performed in block 370 of FIG. 3.

At block 710, authentication may be performed with the new accelerator. For example, as described above the CPU (e.g., CPU 110) and the accelerators may perform mutual authentication using hardware authentication supported by Trusted Platform Module (TPM) technology implemented by the host system.

At block 720, resource metric information (e.g., resource metrics 288) is updated to include the new accelerator. Responsive to detection of the new accelerator, the resource monitoring manager may obtain resource capacity metrics for the new accelerator. Depending upon the particular implementation, the resource capacity metrics may be obtained at the accelerator level or at a finer level of granularity (e.g., at a tile level).

While in the context of the flow diagrams presented herein, a number of enumerated blocks are included, it is to be understood that the examples may include additional blocks before, after, and/or in between the enumerated blocks. Similarly, in some examples, one or more of the enumerated blocks may be omitted or performed in a different order.

Example Computer System

Figure 8:
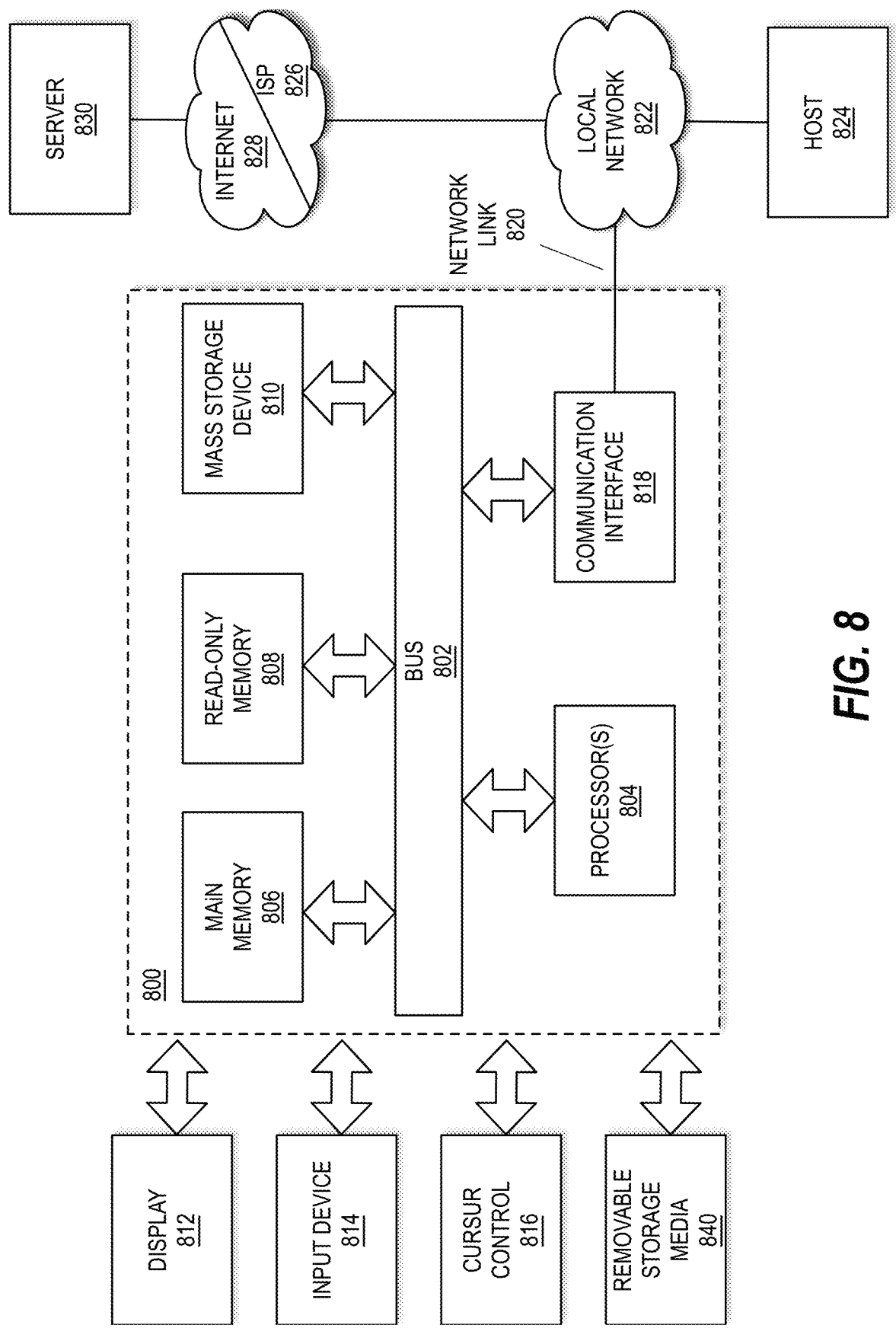
FIG. 8 is a block diagram of a computer system according to some embodiments.

FIG. 8 is a block diagram of a computer system 800 according to some embodiments. Computer system 800 may be representative of all or a portion of the computing resources associated with a host system (e.g., host system 100), such as a server or edge server. Notably, components of computer system 800 described herein are meant only to exemplify various possibilities. In no way should example computer system 800 limit the scope of the present disclosure. In the context of the present example, computer system 800 includes a bus 802 or other communication mechanism for communicating information, and a processing resource (e.g., one or more hardware processors 804) coupled with bus 802 for processing information. The processing resource may be, for example, one or more general-purpose microprocessors or a system on a chip (SoC) integrated circuit, a non-limiting example of which is described below with reference to FIG. 9.

Computer system 800 also includes a main memory 806, such as a random-access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, e.g., a magnetic disk, optical disk or flash disk (made of flash memory chips), is provided and coupled to bus 802 for storing information and instructions.

Computer system 800 may be coupled via bus 802 to a display 812, e.g., a cathode ray tube (CRT), Liquid Crystal Display (LCD), Organic Light-Emitting Diode Display (OLED), Digital Light Processing Display (DLP) or the like, for displaying information to a computer user. An input device 814, including alphanumeric and other keys, is coupled to bus 802 for communicating information and command selections to processor 804. Another type of user input device is cursor control 816, such as a mouse, a trackball, a trackpad, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Removable storage media 840 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 800 may implement the techniques described herein using customized hard-wired logic, one or more ASICs or FPGAs, firmware or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 810. Volatile media includes dynamic memory, such as main memory 806. Common forms of storage media include, for example, a flexible disk, a hard disk, a solid-state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes interface circuitry 818 coupled to bus 802. The interface circuitry 818 may be implemented by hardware in accordance with any type of interface standard, such as an Ethernet interface, a universal serial bus (USB) interface, a Bluetooth® interface, a near field communication (NFC) interface, a PCI interface, and/or a PCIe interface. As such, interface 818 may couple the processing resource in communication with one or more discrete accelerators 805 (e.g., one or more XPUs).

Interface 818 may also provide a two-way data communication coupling to a network link 820 that is connected to a local network 822. For example, interface 818 may be an integrated services digital network (ISDN) card, cable modem, satellite modem, or a modem to provide a data communication connection to a corresponding type of telephone line. As another example, interface 818 may be a local area network (LAN) card to provide a data communication connection to a compatible LAN. Wireless links may also be implemented. In any such implementation, interface 818 may send and receive electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. The received code may be executed by processor 804 as it is received, or stored in storage device 810, or other non-volatile storage for later execution.

Example System on a Chip (SoC) Integrated Circuit

Figure 9:
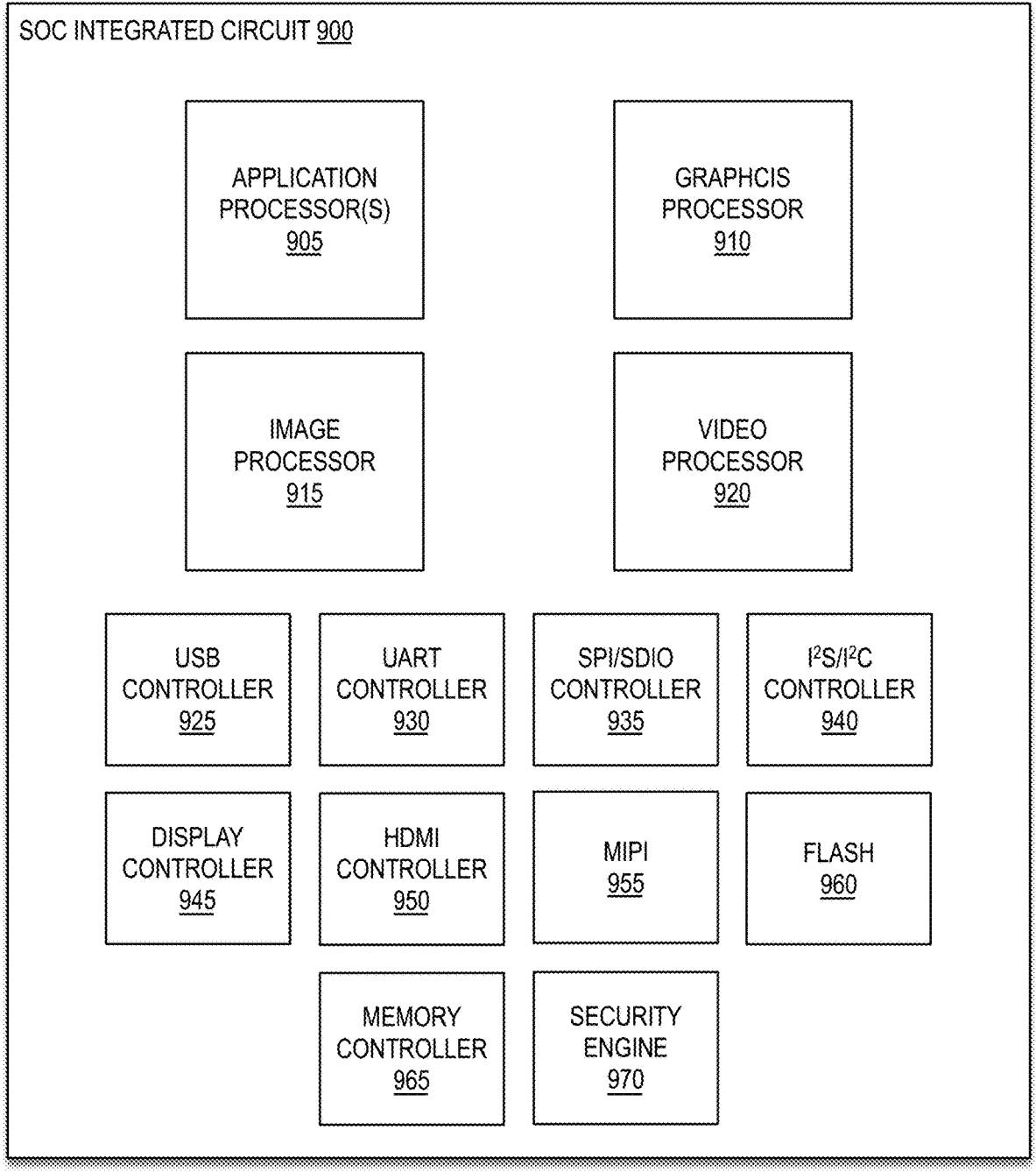
FIG. 9 is a block diagram illustrating an example system on a chip (SoC) integrated circuit in which one or more processors and XPUs may be implemented according to some embodiments.

FIG. 9 is a block diagram illustrating an example system on a chip (SoC) integrated circuit 900 in which one or more processors may be implemented according to some embodiments. In the context of the present example, integrated circuit 900 includes one or more application processor(s) 905 (e.g., CPUs) and one or more XPUs, for example, one or more of a graphics processor 910, an image processor 915, and a video processor 920, any of which may be a modular IP core from the same or multiple different design facilities. Integrated circuit 900 may also include peripheral or bus logic including a Universal Serial Bus (USB) controller 925, a Universal Asynchronous Receiver-Transmitter (UART) controller 930, an SPI/SDIO controller 1235, and an Inter-IC Sound Bus/Inter-IC communication (I²S/I²C) controller 940. Additionally, the integrated circuit can include a display device controller 945 coupled to one or more of a high-definition multimedia interface (HDMI) controller 950 and a mobile industry processor interface (MIPI) display interface 955. Storage may be provided by a flash memory subsystem 960 including flash memory and a flash memory controller. Memory interface may be provided via a memory controller 965 for access to SDRAM or SRAM memory devices. Some integrated circuits additionally include an embedded security engine 970.

Many of the methods may be described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

Some embodiments pertain to Example 1 that includes a method comprising: maintaining by a processing resource of a host system: (i) a resource data structure containing information regarding resource utilization of each accelerator of a set of one or more accelerators associated with a host system; and (ii) a group data structure containing information regarding each group of a plurality of groups of one or more virtual functions (VFs) of the set of one or more accelerators that has been assigned for use by a respective virtual machine (VM) of a plurality of VMs running on a virtual machine monitor (VMM) of the processing resource; receiving, from the VMM, a request to deploy a workload associated with a first VM of the plurality of VMs; and responsive to the request, assigning the workload to a VF of a group of the plurality of groups determined to have resource capacity available to satisfy expected resource utilization of the workload.

Example 2 includes the subject matter of Example 1, wherein the information regarding resource utilization is maintained at a granularity of a given tile of a plurality of tiles that make up the accelerator.

Example 3 includes the subject matter of Examples 1-2, further comprising: receiving a forecast of new workloads for a future time period; and based on the forecast and the resource utilization, selectively causing an accelerator of the plurality of accelerators to be placed into one of a plurality of power states.

Example 4 includes the subject matter of Examples 1-3, further comprising: receiving a forecast of new workloads for a future time period; and based on the forecast, the resource utilization, and a warm-up time of an accelerator of the plurality of accelerators, proactively preparing the accelerator for a new workload.

Example 5 includes the subject matter of Examples 1-4, wherein at least one of the set of one or more accelerators comprises a discrete graphics processing unit (GPU).

Example 6 includes the subject matter of Examples 1-5, wherein at least one of the set of one or more accelerators comprises an integrated GPU.

Example 7 includes the subject matter of Examples 1-6, further comprising responsive to detecting a new accelerator associated with the host system, adding information regarding the new accelerator to the set of one or more accelerators in the resource data structure.

Example 8 includes the subject matter of Examples 1-7, wherein said assigning takes into consideration a forecast of new workloads for a future time period.

Some embodiments pertain to Example 9 that includes a non-transitory machine-readable medium storing instructions, which when executed by a processing resource of a host system cause the host system to: maintain (i) a resource data structure containing information regarding resource utilization of each accelerator of a set of one or more accelerators associated with the host system; and (ii) a group data structure containing information regarding each group of a plurality of groups of one or more virtual functions (VFs) of the set of one or more accelerators that has been assigned for use by a respective virtual machine (VM) of a plurality of VMs running on a virtual machine monitor (VMM) of the processing resource; determine whether a set of one or more remapping criteria are satisfied by a current group of the plurality of groups to which a particular VM of the plurality of VMs is assigned; and responsive to a determination that one or more criteria of the set of one or more remapping criteria are not satisfied by the current group, reassign the VM from the current group to a new group of the plurality of groups that satisfies the set of one or more remapping criteria.

Example 10 includes the subject matter of Example 9, wherein the information regarding resource utilization is maintained at a granularity of a given tile of a plurality of tiles that make up the accelerator.

Example 11 includes the subject matter of Examples 9-10, wherein the set of one or more remapping criteria are expressed in terms of quality of service (QoS), efficiency, or operational costs.

Example 12 includes the subject matter of Examples 9-11, wherein at least one of the set of one or more accelerators comprises a discrete graphics processing unit (GPU).

Example 13 includes the subject matter of Examples 9-12, wherein at least one of the set of one or more accelerators comprises an integrated GPU.

Example 14 includes the subject matter of Examples 9-13, wherein the instructions further cause the host system to responsive to detecting a new accelerator associated with the host system, add information regarding the new accelerator to the set of one or more accelerators in the resource data structure.

Some embodiments pertain to Example 9 that includes a system comprising: a set of one or more accelerators; a processing resource; and a machine-readable medium, coupled to the processing resource, having stored therein instructions, which when executed by the processing resource cause the processing resource to: maintain (i) a resource data structure containing information regarding resource utilization of each accelerator of the set of one or more accelerators; and (ii) a group data structure containing information regarding each group of a plurality of groups of one or more virtual functions (VFs) of the set of one or more accelerators that has been assigned for use by a respective virtual machine (VM) of a plurality of VMs running on a virtual machine monitor (VMM) of the processing resource; receive a request to deploy a workload associated with a first VM of the plurality of VMs; and responsive to the request, assign the workload to a VF of a group of the plurality of groups determined to have resource capacity available to satisfy expected resource utilization of the workload.

Example 16 includes the subject matter of Example 15, wherein the information regarding resource utilization is maintained at a granularity of a given tile of a plurality of tiles that make up the accelerator.

Example 17 includes the subject matter of Examples 15-16, wherein the instructions further cause the processing resource to: receive a forecast of new workloads for a future time period; and based on the forecast and the resource utilization, selectively causing an accelerator of the plurality of accelerators to be placed into one of a plurality of power states.

Example 18 includes the subject matter of Examples 15-17, wherein the instructions further cause the processing resource to: receive forecast of new workloads for a future time period; and based on the forecast, the resource utilization, and a warm-up time of an accelerator of the plurality of accelerators, proactively prepare the accelerator for a new workload.

Example 19 includes the subject matter of Examples 15-18, wherein at least one of the set of one or more accelerators comprises a discrete graphics processing unit (GPU).

Example 20 includes the subject matter of Examples 15-19, wherein the instructions further cause the processing resource to responsive to detecting a new accelerator associated with the system, add information regarding the new accelerator to the set of one or more accelerators in the resource data structure.

Some embodiments pertain to Example 21 that includes an apparatus that implements or performs a method of any of Examples 1-8.

Example 22 includes at least one machine-readable medium comprising a plurality of instructions, when executed on a computing device, implement or perform a method or realize an apparatus as described in any preceding Example.

Example 23 includes an apparatus comprising means for performing a method as claimed in any of Examples 1-8.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A method comprising:
   maintaining by one or more processing resources of a host system: (i) a resource data structure containing information regarding resource utilization of each accelerator of a set of one or more accelerators associated with the host system; and (ii) a group data structure containing information regarding each group of a plurality of groups of one or more virtual functions (VFs) of the set of one or more accelerators that has been assigned for use by a respective virtual machine (VM) of a plurality of VMs running on a virtual machine monitor (VMM) of a processing resource of the one or more processing resources;
   receiving, from the VMM, a request to deploy a workload associated with a first VM of the plurality of VMs; and
   after receipt of the request, assigning the workload to a VF of a group of the plurality of groups determined to have resource capacity available to satisfy expected resource utilization of the workload.

2. The method of claim 1, wherein the information regarding resource utilization is maintained at a granularity of a given tile of a plurality of tiles that make up a given accelerator of the set of one or more accelerators.

3. The method of claim 1, further comprising:
   receiving a forecast of new workloads for a future time period; and
   based on the forecast and the resource utilization of an accelerator of the set of one or more accelerators, selectively causing the accelerator to be placed into one of a plurality of power states.

4. The method of claim 1, further comprising:
   receiving a forecast of new workloads for a future time period; and
   based on the forecast, the resource utilization of an accelerator of the set of one or more accelerators, and a warm-up time of the accelerator, proactively preparing the accelerator for a new workload.

5. The method of claim 1, wherein at least one of the set of one or more accelerators comprises a discrete graphics processing unit (GPU).

6. The method of claim 1, wherein at least one of the set of one or more accelerators comprises an integrated GPU.

7. The method of claim 1, further comprising after detecting a new accelerator associated with the host system, adding information regarding the new accelerator to the set of one or more accelerators in the resource data structure.

8. The method of claim 1, wherein said assigning takes into consideration a forecast of new workloads for a future time period.

9. A non-transitory machine-readable medium storing instructions, which when executed by one or more processing resources of a host system cause the host system to:
   maintain (i) a resource data structure containing information regarding resource utilization of each accelerator of a set of one or more accelerators associated with the host system; and (ii) a group data structure containing information regarding each group of a plurality of groups of one or more virtual functions (VFs) of the set of one or more accelerators that has been assigned for use by a respective virtual machine (VM) of a plurality of VMs running on a virtual machine monitor (VMM) of a processing resource of the one or more processing resources;
   determine whether a set of one or more remapping criteria are satisfied by a current group of the plurality of groups to which a particular VM of the plurality of VMs is assigned; and
   after a determination that one or more criteria of the set of one or more remapping criteria are not satisfied by the current group, reassign the VM from the current group to a new group of the plurality of groups that satisfies the set of one or more remapping criteria.

10. The non-transitory machine-readable medium of claim 9, wherein the information regarding resource utilization is maintained at a granularity of a given tile of a plurality of tiles that make up a given accelerator of the set of one or more accelerators.

11. The non-transitory machine-readable medium of claim 9, wherein the set of one or more remapping criteria are expressed in terms of quality of service (QOS), efficiency, or operational costs.

12. The non-transitory machine-readable medium of claim 9, wherein at least one of the set of one or more accelerators comprises a discrete graphics processing unit (GPU).

13. The non-transitory machine-readable medium of claim 9, wherein at least one of the set of one or more accelerators comprises an integrated GPU.

14. The non-transitory machine-readable medium of claim 9, wherein the instructions further cause the host system to after detecting a new accelerator associated with the host system, add information regarding the new accelerator to the set of one or more accelerators in the resource data structure.

15. A non-transitory machine-readable medium storing instructions, which when executed by one or more processing resources of a host system cause the host system to:
   maintain (i) a resource data structure containing information regarding resource utilization of each accelerator of a set of one or more accelerators associated with the host system; and (ii) a group data structure containing information regarding each group of a plurality of groups of one or more virtual functions (VFs) of the set of one or more accelerators that has been assigned for use by a respective virtual machine (VM) of a plurality of VMs running on a virtual machine monitor (VMM) of a processing resource of the one or more processing resources;
   receive, from the VMM, a request to deploy a workload associated with a first VM of the plurality of VMs; and
   after receipt of the request, assign the workload to a VF of a group of the plurality of groups determined to have resource capacity available to satisfy expected resource utilization of the workload.

16. The non-transitory machine-readable medium of claim 15, wherein the instructions further cause the host system to:
   receive a forecast of new workloads for a future time period; and
   based on the forecast and the resource utilization of an accelerator of the set of one or more accelerators, selectively causing the accelerator to be placed into one of a plurality of power states.

17. The non-transitory machine-readable medium of claim 15, wherein the instructions further cause the host system to:
- receive a forecast of new workloads for a future time period; and
- based on the forecast, the resource utilization of an accelerator of the set of one or more accelerators, and a warm-up time of the accelerator, proactively preparing the accelerator for a new workload.

18. The non-transitory machine-readable medium of claim 15, wherein at least one of the set of one or more accelerators comprises a discrete graphics processing unit (GPU).

19. The non-transitory machine-readable medium of claim 15, wherein at least one of the set of one or more accelerators comprises an integrated GPU.

20. The non-transitory machine-readable medium of claim 15, wherein assignment of the workload to the VF takes into consideration a forecast of new workloads for a future time period.

* * * * *